US012732511B1

(12) United States Patent
Hossain-Mckenzie et al.

(10) Patent No.: US 12,732,511 B1
(45) Date of Patent: Sep. 8, 2026

(54) PROACTIVE INTRUSION DETECTION AND MITIGATION SYSTEM

(71) Applicant: National Technology & Engineering Solutions of Sandia, LLC, Albuquerque, NM (US)

(72) Inventors: Shamina Hossain-Mckenzie, Albuquerque, NM (US); Christian Birk Jones, Albuquerque, NM (US); Adrian R. Chavez, Davis, CA (US); Adam Summers, Albuquerque, NM (US); Nicholas Jacobs, Saint Louis Park, MN (US); Jay Tillay Johnson, Albuquerque, NM (US); James Obert, Kuna, ID (US); Brian J. Wright, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 417 days.

(21) Appl. No.: 17/217,702

(22) Filed: Mar. 30, 2021

Related U.S. Application Data

(60) Provisional application No. 63/016,060, filed on Apr. 27, 2020.

(51) Int. Cl.
*H04L 9/40* (2022.01)
*H04L 67/104* (2022.01)

(52) U.S. Cl.
CPC ...... *H04L 63/1416* (2013.01); *H04L 63/1425* (2013.01); *H04L 63/1466* (2013.01); *H04L 63/20* (2013.01); *H04L 67/104* (2013.01)

(58) Field of Classification Search
CPC ............. H04L 63/1416; H04L 63/1425; H04L 63/1466; H04L 63/20; H04L 67/104
See application file for complete search history.

(56) References Cited

U.S. PATENT DOCUMENTS

2004/0181664 A1 * 9/2004 Hoefelmeyer ...... H04L 63/1408 713/157
2012/0072983 A1 * 3/2012 McCusker ............ H04L 63/126 726/22

(Continued)

OTHER PUBLICATIONS

Network Visualization Intrusion Detection and Network Healing by Rivera et al. (Year: 2019).*

(Continued)

*Primary Examiner* — Jason K Gee
*Assistant Examiner* — Mudasiru K Olaegbe
(74) *Attorney, Agent, or Firm* — Mark A. Dodd; Merle W. Richman

(57) ABSTRACT

A proactive intrusion detection and mitigation system (PIDMS) and method based upon both physical system data and cyber data is disclosed. The physical system data corresponds to one or more aspects of a device that can be measured. These aspects of the device may be controlled, either directly or indirectly, by cyber commands sent over a network. The cyber data corresponds not only to the cyber commands, but virtually any aspect of the cyber command. The PIDMS monitors both the physical system data and the cyber data for anomalies, including anomalies that can only be detected through the combination of physical system and cyber data, i.e., cyber-physical anomalies, as well as monitoring peer-to-peer communication between PIDMSs. These anomalies are detected using signature-based and behavioral-based approaches. Upon detecting an anomaly, the PIDMS undertakes preventative or mitigative action to counter the detected anomaly.

19 Claims, 3 Drawing Sheets

100
110 Receive Cyber Data
120 Receive Physical System Data
130 Extract Data
140 Cyber Anomaly ?
160 Cyber-Physical Anomaly ?
150 Physical System Anomaly ?
N
Y
170 Raise Alarm
190 Pass Traffic
180 Undertake Preventative/ Mitigative Action

(56) References Cited

U.S. PATENT DOCUMENTS

| | | | | |
|---|---|---|---|---|
| 2014/0157405 | A1* | 6/2014 | Joll | H04L 63/1425 726/22 |
| 2016/0099963 | A1* | 4/2016 | Mahaffey | H04L 63/166 726/25 |
| 2017/0180418 | A1* | 6/2017 | Shen | H04L 63/1466 |
| 2019/0141061 | A1* | 5/2019 | Krishtal | H04L 63/101 |
| 2019/0260204 | A1* | 8/2019 | Koval | G06N 3/044 |
| 2020/0244677 | A1* | 7/2020 | Abbaszadeh | H04L 63/1425 |
| 2021/0089661 | A1* | 3/2021 | Rieger | G06F 11/0736 |
| 2021/0112090 | A1* | 4/2021 | Rivera | G06F 21/552 |
| 2023/0162123 | A1* | 5/2023 | Kagan | G06Q 10/04 700/286 |

OTHER PUBLICATIONS

Devices, Systems and Methods for the Collection of Meter Data in a Common, Globally Accessible, Group of Servers, to Provide Simpler Configuration, Collection, Viewing, and Analysis of the Meter Data by Koval et al. (Year: 2019).*

De Benedetti, M. et al., "Anomaly detection and predictive maintenance for photovoltaic systems," Neurocomputing (2018) 310:59-68.

Carpenter, G. A. et al., "Fuzzy ART: Fast Stable Learning and Categorization of Analog Patterns by an Adaptive Resonance System,:" Neural Networks (1991) 4:759-771.

Chandola, V. et al., "Anomaly Detection: A Survey," ACM Comput. Surv. 41, 3, Article 15 (Jul. 2009) 58 pages.

Chavez, A. R. et al., "Artificial Diversity and Defense Security (ADDSec) Final Report," Sandia National Laboratories, SAND2018-4545, 57 pages.

Cheung, S. et al., "Using Model-based Intrusion Detection for SCADA Networks," Proceedings of the SCADA Security Scientific Symposium (Jan. 2007) Miami Beach, Florida, 12 pages.

Hossain-Mckenzie, S. et al., "Proactive Intrusion Detection and Mitigation System: Case Study on Packet Reply Attacks in Distributed Energy Resource Systems," to be published, 6 pages.

Jones, C. B. et al., "Unsupervised Online Anomaly Detection to Recognize Cyber-Attacks on Internet Connected Photovoltaic System Inverters," to be published, 4 pages.

Lin, H. et al., "Adapting Bro into SCADA: Building a Specification-based Intrusion Detection System for the DNP3 Protocol," CSIIRW '13: Proceedings of the Eight Annual Cyber Security and Information Intelligence Research (2013) Article No. 5, pp. 1-4.

Rahman, M. A. et al., "False Data Injection Attacks with Incomplete Information Against Smart Power Grids, " IEEE Globe Communications Conference (GLOBECOM) (2012) 3-7 Dec., Anaheim, CA, pp. 3153-3158.

Shila, D. M. et al., "Catching Anomalous Distributed Photovoltaics: An Edge-based Multi-modal Anomaly Detection," arXiv:1709.08830 (2017), 13 pages.

Valli, C., "Snort IDS for SCADA Networks," Int'l. Conf. Security and Management (2009) Las Vegas, NV, July, pp. 618-621.

Zhu, B. et al., "SCADA-specific Intrusion Detection/Prevention Systems: A Survey and Taxonomy," (2010), 16 pages.

* cited by examiner

PROACTIVE INTRUSION DETECTION AND MITIGATION SYSTEM

RELATED APPLICATIONS

This application claims priority to U.S. Provisional Application No. 63/016,060, filed on Apr. 27, 2020, and entitled PROACTIVE INTRUSION DETECTION AND MITIGATION SYSTEM, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a proactive intrusion detection and mitigation system that integrates physical system data with cyber data, thereby capturing the intricacies of system models and correlating physical system measurements to specific events on the communications and control network via a hybrid of signature-based and behavioral-based algorithms.

BACKGROUND

Interoperable distributed energy resource (DER) grid-support functions enable high penetrations of renewable energy resources that would otherwise not be feasible. These commanded and configurable autonomous functions have been shown to: (1) improve voltage regulation on distribution circuits, (2) expand distribution hosting capacity, (3) provide wide-area damping, (4) perform frequency control, and (5) provide ancillary services. Adding these interoperable control functions has effectively added power generators to the Internet of Things (IoT), while simultaneously raising a number of concerns regarding cyber-physical attacks.

In theory, controlling an aggregation of DER devices could have grave impact on power system reliability, stability, and safety. Fault detection models are able to flag malicious events that impact the grid, but are unable to detect cyber actors that have gained unauthorized access to the network and are unable to detect cyber attacks early enough to thwart malicious actions. Therefore, more robust defense mechanisms are needed in the form of intelligent Intrusion Detection Systems (IDSs). Well-designed IDSs provide the ability to detect malicious and abnormal events as quickly as possible, and to highlight relevant information to enable grid operators to respond appropriately to these events.

IDSs are responsible for detecting threats by monitoring one or more data streams. Intrusion Prevention Systems (IPSs) expand this capability by taking immediate action to contain the detected threat. The implementation of IDSs/IPSs for cyber-physical DER operations pose numerous challenges, since traditional IDSs focus only on cyber, i.e., network traffic, data, which includes communications between routers, switches, and endpoints. These systems commonly use either signature-based or behavioral metrics to detect malicious network activities. Signature-based algorithms monitor data and flag activity when known malware signatures are observed. In many cases, if a signature match is found, the IPS applies a predetermined rule, for example, blocking traffic, quarantining data, etc. Some signature-based systems include, for example, the Snort IDS, the Zeek (formerly Bro) IDS, and the Suricata IDS. See C. Valli, "Snort IDS for SCADA Networks," in Proceedings of the International Conference on Security and Management, pp. 618-621 (2009); H. Lin et al., "Adapting Bro into SCADA: Building a Specification-based Intrusion Detection System for the DNP3 Protocol," in Proceedings of the Eighth Annual Cyber Security and Information Intelligence Research Workshop, art. no. 5, pp. 1-4 (2013); and R. Bray et al., "OSSEC HIDS Host-Based Intrusion Detection Guide," Syngress (2008), the contents of each of which are incorporated herein by reference. Behavioral algorithms focus on recognizing or classifying anomalous patterns in network data compared to a baseline. See V. Chandola et al., "Anomaly Detection: A Survey," ACM Computing Surveys, vol. 41, no. 3, art. no. 15 (2009), the contents of which are incorporated herein by reference. Behavioral-based algorithms can be trained on pre-existing data automatically or manually by an operator, and are often implemented using statistical machine learning or artificial intelligence algorithms. See B. Zhu and S. Sastry, "SCADA-specific Intrusion Detection/Prevention Systems: A Survey and Taxonomy," in Proceedings of the 1st Workshop on Secure Control Systems (SCS), vol. 11, p. 7 (2010), the contents of which are incorporated herein by reference.

The following is a non-exclusive list of potential malicious attacks and a brief description of each for DER devices:

Disconnect attack: An adversary gains control of a large number of PV inverters and issues a mass disconnect command. If this occurs during heavy load conditions, it can cause line overloads, frequency/voltage violations, and system instabilities.

Power curtailment attack: An adversary alters the control algorithm parameters to reduce the allowable power output of the PV inverter. Detection of this type of attack can be difficult, as the system appears to be operating normally with partially reduced performance.

Volt-VAr attack: An adversary manipulates inverter control to arbitrarily inject a different level of reactive power, affecting the voltage magnitude and phase angles in the grid.

Reverse power flow attack: An adversary gains control of smart grid appliances and shuts them off or triggers circuit breakers to initiate a reduced demand response. This results in an increased reverse power flow under stressed conditions, which can cause line overloads and disrupt line voltage regulators that could lead to voltage collapse.

The predictability and regularity of communications and endpoint operations within energy delivery systems make IDSs especially effective. For example, Denial of Service (DoS) attacks using malformed packets, unauthorized reading of data, and unauthorized writing of data can be detected using the Snort IDS. See S. Cheung et al., "Using Model-based Intrusion Detection for SCADA Networks," in Proceedings of the SCADA security scientific symposium, vol. 46, pp. 1-12 (2007), the contents of which are incorporated herein by reference. Additionally, system calls, the duration of software executing on an end device, the number of bytes sent and received, and the processor/memory utilization are all useful features that can be extracted from end devices to detect anomalous behavior. See A. R. Chavez et al., "Artificial Diversity and Defense Security (ADDSec) Final Report," Sandia Report SAND2018-4545 (2018), the contents of which are incorporated herein by reference. IDS mechanisms can perform well in these environments, operating strictly off of cyber data alone. However, spoofing of the physical system data that signature-based and behavioral-based IDSs depend on can defeat such pure cyber-based detection mechanisms.

In DER systems, it is not sufficient to only detect cyber anomalies—it is critical to connect the detected cyber events with their corresponding effects in the physical power system. This is especially important for developing mitigation techniques and understanding the overall impact on the cyber-physical system. Furthermore, distinguishing malicious events from other sources of anomalies is particularly difficult.

Anomaly detection on the grid has largely focused on fault detection and location identification, which typically involves comparison between actual and predicted performance using power system models and physical system sensor data. See M. D. Benedetti et al., "Anomaly detection and predictive maintenance for photovoltaic systems," Neurocomputing, vol. 310, pp. 59-68 (2018), the contents of which are incorporated herein by reference. While this approach is reasonably successful at producing warnings for imminent faults, it provides limited awareness of the underlying causes behind anomalies, which can result from systemic failures stemming from hardware or software, human error, or malicious intent. Consequently, little actionable insight is gained in terms of identifying the appropriate responses to ensure continued system availability.

While these various IDSs/IPSs work reasonably well in IT environments, monitoring cyber data alone may not be enough to detect certain operations technology (OT) threats. Thus, the need exists for a hybrid approach based on both power system and network information, i.e., physical system data with cyber data. While the above background relates to DER devices, and DER devices will be used throughout as an exemplary application, any device with both measurable and cyber controlled attributes may benefit from the present invention.

SUMMARY

One aspect of the present invention relates to a Proactive Intrusion Detection and Mitigation System (PIDMS) and corresponding method based upon both physical system data and cyber data. The physical system data corresponds to one or more aspects of a physical device that can be measured, for example, voltage, current, frequency, power, remaining power, revolutions-per-minute (RPM), height (or elevation), position, weight (or mass), flow, pressure, etc. These aspects of the device may be controlled, either directly or indirectly, by, for example, commands sent over a network, i.e., the commands are cyber commands. These cyber commands include those commands sent to the device, but also include those commands sent from the device to other devices. The cyber data corresponds not only to these cyber commands, but virtually any aspect of the cyber command, for example, the source of the cyber command, the target of the cyber command, the format of the cyber command, etc. The cyber commands themselves may, for example, direct a device to start, to continue, to change (increase or decrease a setting), or stop. The PIDMS then monitors both the physical system data and the cyber data for anomalies, including anomalies that can only be detected through the combination of the physical system data and the cyber data, i.e., cyber-physical anomalies. These anomalies are detected using signature-based and behavioral-based algorithms. Upon detecting an anomaly, the PIDMS takes preventative or mitigative action, for example, not retransmitting an anomalous cyber command, or transmitting a cyber command to counteract the anomalous cyber command. As used in this patent, the term cyber-physical anomaly is defined as an anomaly that causes abnormal behavior in both cyber and physical data streams; it is either a cyber system-based event (e.g., a cyber attack) that causes an impact or abnormality to the physical system or a physical system-based event (e.g., an outage in a power system control center) that causes an impact or abnormality to the cyber system.

In at least one embodiment of the present invention, a PIDMS receives both the physical system data and the cyber data related to a physical device. The PIDMS then employs signature and behavioral-based algorithms to detecting anomalies in the separate physical system data and cyber data. The PIDMS also detects cyber-physical anomalies based on the combination of the physical system data and the cyber data, where gaps in one type of data may be filled with data from the other type.

In at least one embodiment of the present invention, a method for use in proactively detecting and mitigating intrusion comprise the steps of receiving physical system data or cyber data (physical system data corresponds to one or more measurable aspects of the device, cyber data corresponds to one or more cyber commands or one or more aspects of the one or more cyber commands), detecting a physical system anomaly, a cyber anomaly, or a cyber-physical anomaly based upon the received physical system data or cyber data, the step of detecting including detecting a physical system anomaly, a cyber anomaly, or a cyber-physical anomaly based upon the received physical system data or cyber data using both a signature-based algorithm and a behavioral-based algorithm, and upon detecting a physical system anomaly, a cyber anomaly, or a cyber-physical anomaly, taking a preventative action or a mitigative action.

In some embodiments of the present invention, the one or more measurable aspects of the device include voltage, current, frequency, power, revolutions-per-minute (RPM), height, elevation, position, weight, mass, flow, or pressure; the one or more cyber commands or one or more aspects of the one or more cyber commands include start, continue, change, stop, frequency, setpoint values, destination and source IP addresses, destination and source ports, sequence number, time-to-live (TTL), checksum, TCP flags, destination and source MAC addresses, IP version, packet length, throughput, latency, user-agent strings, HTTP headers, TCP headers, session IDs, suspicious characters or data types, authentication logs, or security logs; the signature-based algorithm includes a Snort algorithm, a Zeek algorithm, or a Suricata algorithm and the behavioral-based algorithm includes a machine learning algorithm, an artificial intelligence algorithm, or an artificial intelligence algorithm capable of simultaneous online learning and detection; the preventative action includes blocking an IP address, not retransmitting an anomalous cyber command, not forwarding an anomalous cyber command, blocking an executable, or preventing future user logins; the mitigative action includes transmitting a cyber command that counters a device attribute that may be out of range or transmitting a cyber command that counters a previous anomalous cyber command; further includes the step of upon detecting an anomaly, implementing peer-to-peer communication of data related to the detected anomaly; the peer-to-peer communication employs a wireless mesh network; and further includes the step of upon detecting an anomaly, displaying data related to the detected anomaly.

Other embodiments of the present invention include a system for implementing the afore proactive intrusion detection and mitigation method, while still other embodiments of the present invention include a computer-readable storage device with instructions for implementing the afore proactive intrusion detection and mitigation method.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Overview

Figure 1:
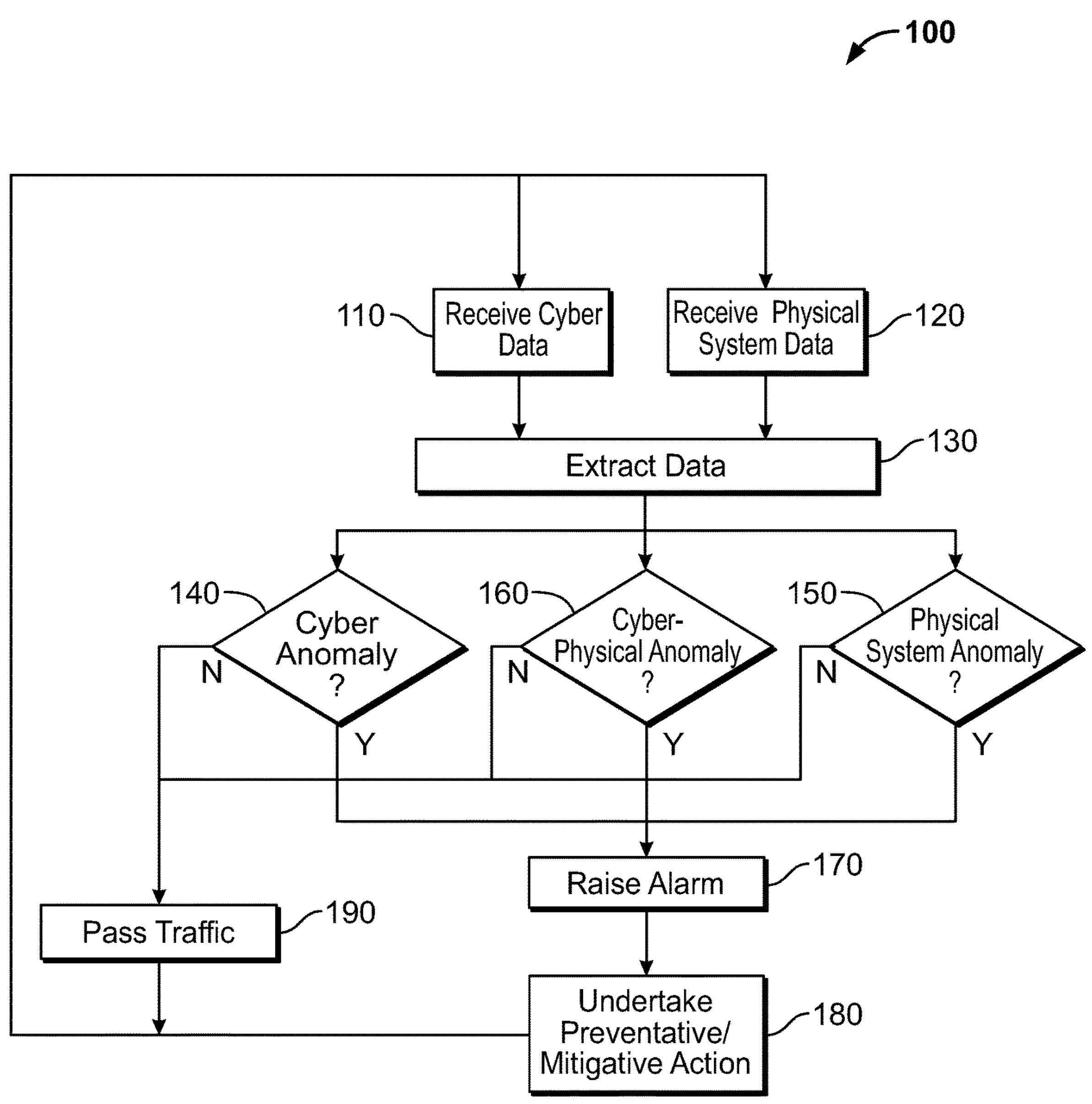
FIG. 1 illustrates a flowchart of the method employed by a Proactive Intrusion Detection and Mitigation System (PIDMS) in accordance with one or more embodiments of the present invention.

A PIDMS 100 in accordance with one or more embodiments of the present invention performs anomaly detection analyses on both the cyber data and the physical system data to determine whether an attack has been conducted and then acts to mitigate the attack. FIG. 1 illustrates this monitoring, analysis, and mitigation method in the form of a flowchart. The PIDMS 100 captures data from DER cyber communications in step 110 and from measurement equipment in step 120 in parallel, including, for example, advanced metering infrastructure, voltage/current sensors, phasor measurement units, and DER devices, i.e., the physical system data. The PIDMS 100 extracts measurable features from the corresponding raw data, for example, packet length, polling frequency, power factor, etc., in step 130. If unexpected behavior occurs in the DER power system, such anomalies may be identified in the cyber data in step 140. If malicious traffic is being sent from a DER device in a manner that is difficult to detect using network data, it may be identified via anomalies in the physical system data in step 150. As some anomalies may only be detected using a combination of both the cyber data and the physical system data, such cyber-physical anomalies are detected in step 160. The cyber anomaly detection step 140, the physical system anomaly detection step 150, and the cyber-physical anomaly detection step 160 correspond to the IDS functionality of the PIDMS 100. If a cyber anomaly is detected in step 140, a physical system anomaly is detected in step 150, or a cyber-physical anomaly is detected in step 160, the PIDMS 100 raises an alarm in step 170. If no anomalies are detected, then the PIDMS 100 allows the traffic to pass to the intended DER device in step 190 and loops back to parallel steps 110 and 120 to continue monitoring incoming cyber data and physical system data.

Upon an alarm being raised in step 170, the PIDMS 100 takes preventative and/or mitigative action(s) in step 180, i.e., the IPS functionality of the PIDMS 100. Preventative actions may include, for example, blocking an IP address, not retransmitting (forwarding) an anomalous cyber command, blocking an executable, preventing future user logins, etc. Mitigative actions may include, for example, transmitting a cyber command that counters some device attribute that may be out of range, for example, a cyber command that sets an upper (or lower) voltage, current, or frequency limit for the DER, or transmitting a cyber command that counters a previous anomalous cyber command. In certain embodiments of the present invention, the preventative and/or mitigative action(s) in step 180 can be summarized as flag (but send the traffic unaltered), modify the traffic, drop (block) the traffic, and operator intervention. Once the preventive and/or mitigative action is undertaken in step 180, the PIDMS 100 loops back to parallel steps 110 and 120 and continues its monitoring of incoming cyber data and physical system data, in part to determine the effectiveness of the undertaken preventive and/or mitigative action of step 180.

The PIDMS 100 must operate even under additional complexities related to the limited availability of data. Obtaining both cyber data and physical system data requires a higher throughput for the PIDMS 100, and the physical system data collected in step 120 is often sparse, leading to challenges in real-time operation and response. Therefore, successful operation of the PIDMS 100 depends not only on the accuracy and precision of the cyber, physical system, and cyber-physical anomaly detection models in steps 130, 140, and 150, but also on meaningful data collection and feature extraction in steps 110, 120, and 130.

In developing the PIDMS 100 to detect intrusions or undesired behavior, one must identify which features of the raw data will be examined. There are significant differences in what a feature is, and its usefulness based on its source and the type of information it contains. In the present invention, IDS features are separated into several categories, such as measurable system features, network traffic features, and host-based features. These can be further segregated as well, such as network traffic on a control network versus network traffic for a web-based management interface or portal.

While examining behavior for a PIDMS 100 for DER and distribution control systems in accordance with various embodiments of the present invention, the first set of features of interest are those around the measurable performance and behavior of the system, which are collected from the power models and physical system sensors operating in the system. These can include measurable system feature information, for example: (1) current (AC/DC), (2) voltage (AC/DC, including sags, dips, or spikes), (3) active, apparent, and reactive power, and (4) frequency. Information regarding these various measurable system features serve as inputs to step 120.

As these measurable system feature variables are used in the various control schemes and algorithms applied to manage grid-support functions, being able to measure and determine whether the system is behaving as expected is critical for any PIDMS solution for DERs. Since the data is often temporally sparse, the PIDMS may incorporate ground truth data or power system models to provide expected values for these measurable system feature variables.

While measurable system features are sufficient for detecting faults, they are often insufficient for detecting nefarious activity. As control systems operate over a communications network, the network traffic must likewise be analyzed to reveal behaviors outside the scope of the physical system data. In the case of a malicious attack, altered data values and commands may produce a system response that impacts grid performance without generating anomalies in the power system model. Moreover, the attacker may either spoof or block physical system data from being passed to prevent normal fault detection mechanisms from being triggered. To effectively detect and respond against this type of threat, additional features that can be measured earlier in the attack cycle are required. These can include network traffic (control signal) features, for example: (1) frequency, (2) setpoint values, (3) destination and source IP addresses, (4) destination and source ports, (5) sequence number, (6) time-to-live (TTL), (7) checksum, (8) TCP flags, (9) destination and source MAC addresses, (10) IP version, (11) packet length, (12) throughput, and (13) latency. Information regarding these various control signal features serve as inputs to step 110.

Grid-connected IoT devices often include a web portal for management and monitoring, and smart inverters and their management platforms may include such capabilities as well. These communications are usually segregated from the control network functionality. These portals unfortunately create an additional attack surface that must be protected in the system. To detect malicious attacks in these devices, specific features can be parsed from the network traffic (web management interface) features, for example: (1) user-agent strings, (2) HTTP headers, (3) TCP headers, (4) session IDs, (5) suspicious characters or data types, and (6) authentication logs. Information regarding these various web management interface features also serve as inputs to step 110.

Not every indicator of system compromise can be discovered by examining network traffic alone. Advanced persistent threats on the system may operate in stealth, producing little or no network activity until triggered by an attacker. It is useful to examine differences in the endpoints of the system that are hosting the required control system functionality, in this exemplary case, the smart inverters themselves. This can be done by measuring changes to elements of the inverter operating system or firmware, for example files, network configuration, processing, and memory. Information regarding these various changes of DER elements also serve as inputs to step 110.

Additional memory usage or changes in timing patterns for processing may likewise be indicative of additional processing being performed, potentially hidden from the user. Thus, the PIDMS 100 of various embodiments of the present invention can also consider, for example: (1) file integrity, (2) memory usage, (3) processor usage, and (4) security logs. Information regarding these various aspects of the DER elements would likewise serve as inputs to step 110.

To achieve optimal detection of activities that may degrade DER security or performance, a variety of data sources must be used to collect relevant features. By applying a combination of signature-based and behavioral techniques to these features, the PIDMS 100 in accordance with various embodiments of the present invention can detect a wide range of attack types covering the overall system attack surface. Furthermore, when multiple PIDMS 100 instantiations are installed in a single overall system, the different PIDMS 100 instantiations, in accordance with one or more embodiments of the present invention, can conduct peer-to-peer communication to increase the variety of data sources and situational awareness. This may be implemented, for example, by utilizing a publisher/subscriber framework where data related to the detected anomalies (and optionally other operational changes) are published by one PIDMS 100 instantiation and other PIDMS 100 instantiations can subscribe to that information. This publication/subscriber functionality may be implemented using, for example, the Message Queuing Telemetry Transport (MQTT) protocol. These peer-to-peer PIDMS 100 communications may be implemented using a wireless mesh network that is not connected to the internet for additional security.

When training the behavioral models in the PIDMS 100, the priorities for detection and the quality of data that is available must be considered. Sensitivity analysis is preferably performed to identify the features that are best suited for detecting each type of anomaly. A PIDMS 100 that incorporates response capabilities will also need to prioritize features that indicate the earlier stages of an attack, for example, network packets used for reconnaissance. A PIDMS 100 that seeks to prevent denial-of-service type attacks may need to prioritize relevant features such as throughput and memory usage. Moreover, these considerations need to be made with reliability in mind, as even the most precise model will fail to detect an event if the source data is not available over an extended period of time. For example, even if the detection model performs better on network data than on host data from a device, the host data may still have high importance if the network data is frequently unavailable.

The hybrid approach of employing signature-based and behavioral-based algorithms on both the cyber data and the physical system data builds upon the strengths of both approaches. Signature-based techniques match specific strings or sequences of bytes that are indicative of malware and can detect already existing malware that has previously been observed. Signature-based techniques do not, however, catch zero-day attacks or other attacks that do not have signatures. Behavioral-based techniques observe behavior and make classifications as to whether the behavior is normal or anomalous, and can potentially catch previously unobserved malware or those without signatures. Behavioral-based techniques may, however, suffer from misclassification, causing false-positives or false-negatives.

To reduce the number of false positives or false negatives, the PIDMS 100, in accordance with one or more embodiments of the present invention, may employ simultaneous online learning and detection, enabling continuous learning after the original installation. For example, the PIDMS 100 may implement an adaptive resonance theory (ART) artificial neural network (ANN) approach to achieve simultaneous learning and detection of events. See G. A. Carpenter et al., "Fuzzy ART: Fast Stable Learning and Categorization of Analog Patterns by an Adaptive Resonance System," Neural Networks, vol. 4, no. 6, pp. 759-771 (1991), the contents of which are incorporated herein by reference. See also, C. B. Jones et al., "Unsupervised Online Anomaly Detection to Identify Cyber-Attacks on Internet Connected Photovoltaic System Inverters," to be published, the contents of which are incorporated herein by reference.

In one or more embodiments of the present invention, the PIDMS 100 may further support front-end visualization platforms to display the detected anomalies and other information to the user. For example, the PIDMS 100 may support visualization using, for example, Kibana or Grafana, to create a dashboard of the health of the system.

Evaluation Attack Types

The previous Overview section discussed the various types of information that may be useful for detection and behaviors of interest. These two aspects of the problem of intrusion detection will be connected using several hypothetical attack types that mimic known cases of OT focused cyber attacks and display diversity in the types of information required for detection.

Attack Type 1 (False Data Injection—Control Settings): False data injection is a cyber attack type where incorrect data or commands are injected into an application. In control system networks, this is a large concern as many common control protocols, such as Modbus and IEEE 1815 (DNP3), were not originally designed to incorporate security features that could prevent such an attack. Since then, Modbus has a version that adds TCP Security and DNP3 secure authentication was added to the standard in 2012 to reduce the threat, through these are rarely used in practice. See Modbus Organization, Inc., "MODBUS/TCP Security: Protocol Specification," MB-TCP-Security-v21 2018-07-24, Tech. Rep., 07 (2018) and IEEE Power and Energy Society, "IEEE Std. 1815: IEEE Standard for Electric Power Systems Communications—Distributed Network Protocol (DNP3)," Tech. Rep., 10 (2012), the contents of each of which are incorporated herein by reference. In a type 1 attack, the malicious data is either issued through a replay attack, man-in-the-middle attack, or some other technique to change the DER setpoints or falsify data sent back upstream to an aggregator, grid operator, or DER vendor. A variant of a type 1 attack is false data injection of measurement data used for monitoring the distribution system, i.e., data purportedly corresponding to one or more aspects of the distribution system. See M. A. Rahman and H. Mohsenian-Rad, "False data injection attacks with incomplete information against smart power grids," in 2012 IEEE Global Communications Conference (GLOBECOM), pp. 3153-3158 (2012), the contents of which are incorporated herein by reference.

Attack Type 2 (Insider Threat): Insider threats are very difficult to detect because the threat is a valid, authorized user. Therefore, cyber features such as source IP, port number, and packet frequency indicators are not useful. Physical system features may be more capable of detecting an insider threat if the attack impacts the power system by changing the DER operations or performance. That is, utilizing knowledge of the physical system to block or thwart unallowable control settings can be used even if it appears the commands are coming from a valid source.

To better understand the operation of PIDMS 100 in accordance with various embodiments of the present invention in a cyber-physical environment, an experiment was conducted on a distribution system simulation that contained three interoperable PV inverters. The feeder represented a distribution system located in Albuquerque with 440% PV penetration and was simulated using an Opal-RT 5600. The three utility-scale PV systems located on this feeder were 258 kW, 1 MW, and 10 MW and modeled using the EPRI PV Simulator. The PV simulator has the ability to be interfaced to a real-time power system simulation and includes DNP3 communication interfaces that allow power measurements (AC power, reactive power, AC voltage, frequency, etc.) to be captured and the power factor (PF) to be configured on the devices.

Figure 2:
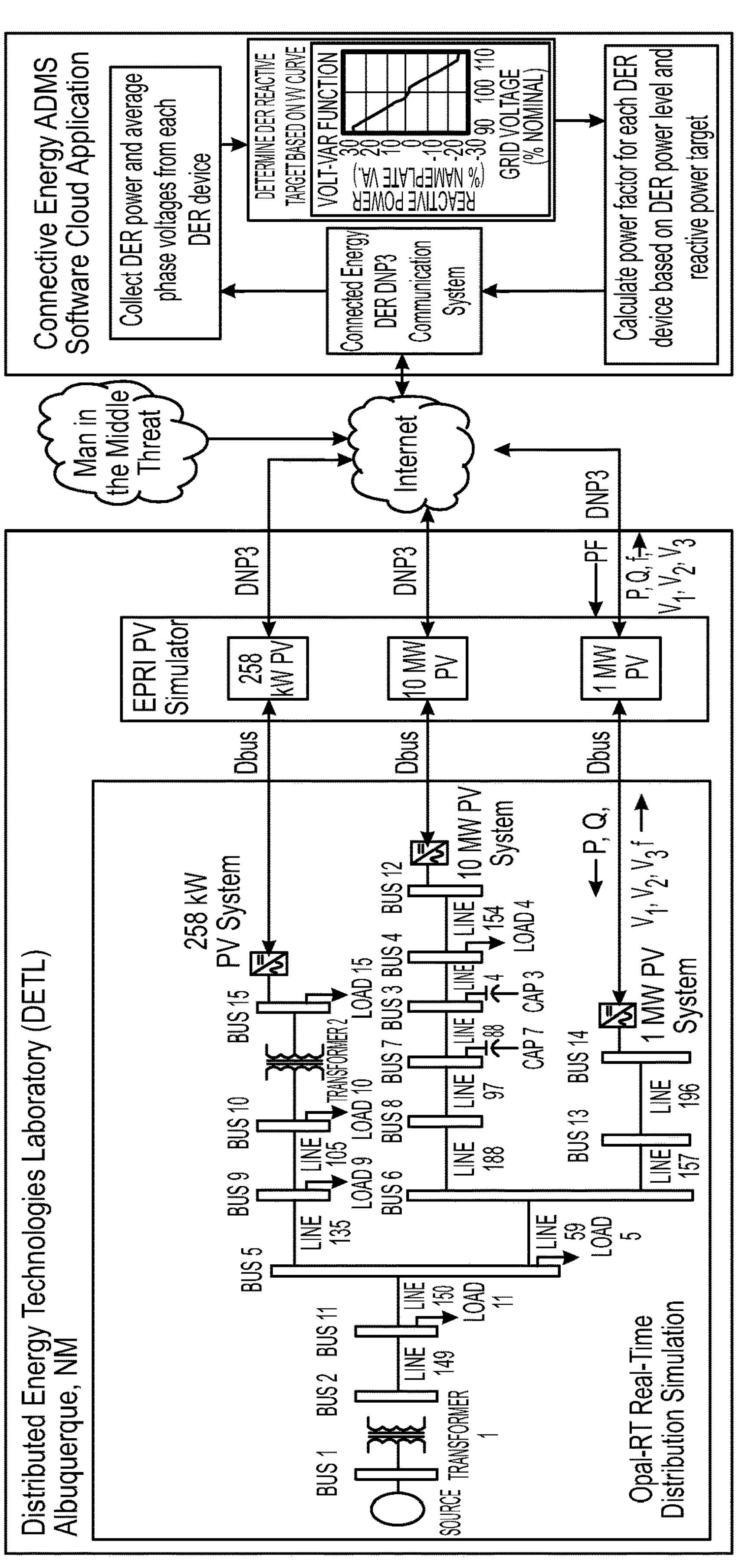
FIG. 2 illustrates an experimental setup used to evaluate a PIDMS in accordance with one or more embodiments of the present invention.

An Advanced Distribution Management System (ADMS) software developer, Connected Energy, issued power factor settings to the devices based on a Volt-VAr (VV) profile represented by the points: V=92, 99, 101, 108% of nominal voltage and Q=25, 0, 0, −25% of reactive power capacity of the DER device. The experimental setup is illustrated in FIG. 2. When configured correctly (like in this case), the VV function used the reactive power capabilities of DER devices to drive the power system toward nominal voltage. A 40-minute simulation of the power system was run for this VV curve. Then the ADMS company acted as an insider threat, i.e., a Type 2 attack, and reversed the sign on the reactive power (Q=−25, 0, 0, 25) to drive the power system away from nominal voltage. In the reversed case, the DER injected or absorbed reactive power to force the grid voltage away from nominal. The impact to the power system from a man-in-the-middle attack, i.e., a Type 1 attack, would have been the same.

Results

Figure 3:
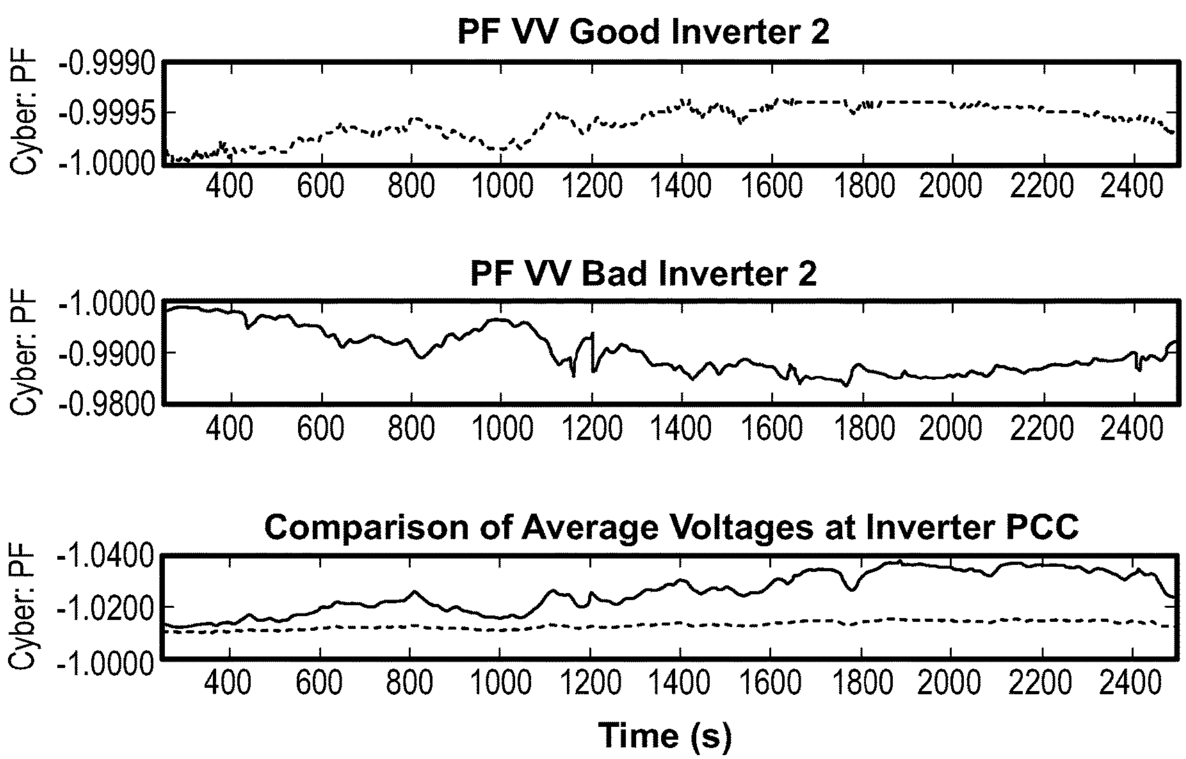
FIG. 3 illustrates the power factor values for a 10 MW PV system under normal and attack states used to evaluate a PIDMS in accordance with one or more embodiments of the present invention.

The power factor values for the 10 MW PV system for the normal and attacked states are illustrated in FIG. 3. As illustrated in FIG. 3, the DER device absorbs reactive power (negative PF) when the VV curve was programmed correctly. This kept the voltage at the Point of Common Coupling (PCC) of the PV system, corresponding to bus 12 in FIG. 3, close to nominal. In the attacked case, the DER injected reactive power (positive PF) and the voltage increased significantly on Bus 12.

Figure 4:
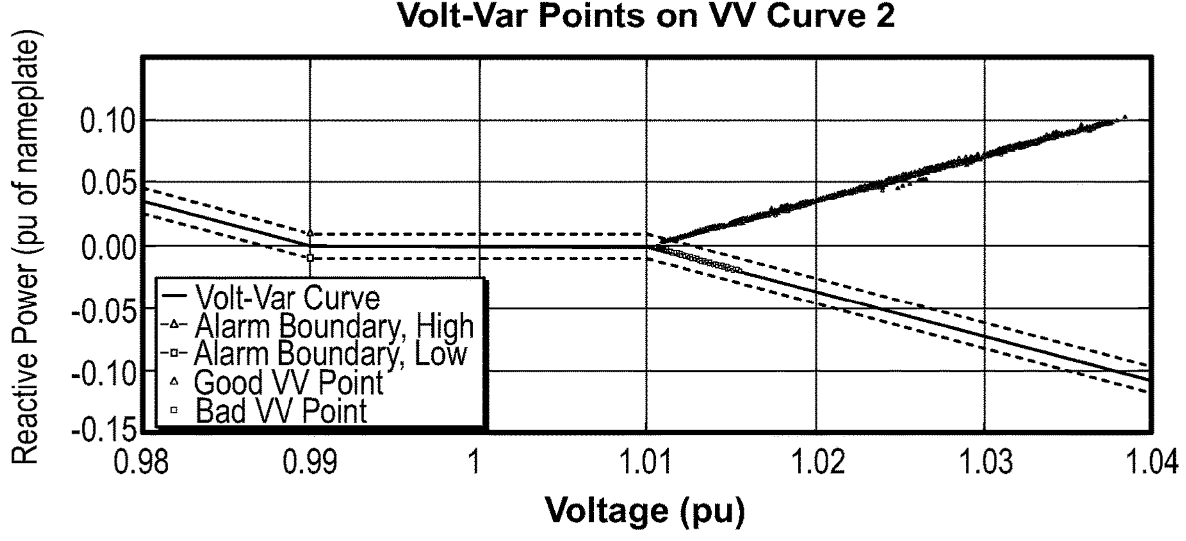
FIG. 4 illustrates the voltage and reactive power injection of the Point of Common Coupling (PCC) bus used to evaluate a PIDMS in accordance with one or more embodiments of the present invention.

During the experiments, the DNP3 traffic to the DER devices was captured and the power system current and voltage were measured at the buses. In this attack scenario, the insider could potentially spoof the communications data, so the power system data was used to create a simple classification mechanism. The voltage and reactive power injection of the PCC bus are illustrated in FIG. 4. A simple alarm mechanism was devised by bounding the normal Volt-VAr curve. As illustrated for the "good" and "bad" DER operations, the physical system data measurements could easily determine when operations were anomalous, an alarm could be raised, and preventative or mitigative action(s) could be taken by the PIDMS.

However, in the case where there was no voltage or current measurements at the PV PCC, PV voltage reads, and PF writes from the ADMS could have been extracted from the DNP3 data. Since the EPRI inverter is configured per the DNP Application Note AN2013-001 information model, this data is relatively easily captured from the network traffic.

Hybrid attack scenarios are also possible. If only a PF was issued and the voltage was not measured from the DER, the voltage measurements from the power system would be necessary to conduct the alarm classification. It is more common that VV curves are programmed into DER devices, so if the equipment was programmed with the inverted "bad" VV curve, PF commands would not have been issued or captured. In that case, voltage and reactive power/power factors would need to have been collected from the DER or the power meter.

As shown in Table I, depending on what data is available from the power system or from the DER network traffic, either the physical system, cyber, or cyber-physical features are required to detect the malicious actions, whether due to a Type 1 or a Type 2 attack. For instance, in Case 2, only the cyber data is necessary to detect misprogramming of the DER device. Similarly, for Cases 3-5, only the physical system data is necessary. However, in Case 6, cyber data and physical system data are both necessary to detect a cyber-physical anomaly due to a cyber attack. Collecting duplicative data, for example, voltage measurements from both the power system and the DER devices, is useful because this corroborates the integrity of the DER communications and power measurements. If there are discrepancies in multiplicative measurements, this would be a clear indication of a cyber attack or sensor faults. Collecting cyber-physical measurements provides higher confidence by marrying the two data streams. To fool the PIDMS 100 in accordance with one or more embodiments of the present invention would require extra steps to spoof or disable various data streams and collection mechanisms, which increases the difficulty of compromising the DER devices while remaining undetected. There does become a point where there is not enough data to conduct these assessments with cyber-physical data, such as in Case 7, in which there is no data about the DER PF or reactive power to determine if the device is behaving as intended.

TABLE 1

| PIDMS Attack Detection | | | | | | | | |
|---|---|---|---|---|---|---|---|---|
| | | | | | Cyber Data | | | |
| | Physical System Data | | | | | | | Physical/ |
| Case | Current Phasor | Voltage Phasor | Reactive Power | Detect? | PF Write | V Read | Detect? | Cyber Detect? |
| 1 | Y | Y | Y | Y | Y | Y | Y | Y |
| 2 | N | N | N | N | Y | Y | Y | Y |
| 3 | Y | Y | Y | Y | N | N | N | Y |
| 4 | Y | Y | N | Y | Y | N | N | Y |
| 5 | Y | Y | N | Y | N | N | N | Y |
| 6 | N | N | Y | N | N | Y | N | Y |
| 7 | N | Y | N | N | N | Y | N | N |

The power of the PIDMS approach is most evident in case 6, which shows that the PIDMS 100 is more than logically ORing together a physical system data detection scheme with a cyber data detection scheme. In particular, case 6 shows that even though neither the physical system data detection scheme nor the cyber data detection scheme individually could detect an issue, the PIDMS approach of various embodiments of the present invention would detect such a cyber-physical anomaly.

The PIDMS approach has also been successfully tested against an insider threat attack, a packet replay attack, a denial of service (DoS) via SYN flood, a man-in-the-middle (MITM) data spoof, a MITM DoS, a reconnaissance attack, an unauthorized client access exploit, and a spoofed TCP handshake. See S. Hossain-McKenzie et al., "Proactive Intrusion Detection and Mitigation System: Case Study on Packet Replay Attacks in Distributed Energy Resource Systems," to be published, the contents of which are incorporated herein by reference.

Applications

While the above embodiments of the present invention were described in the context of DER devices, the present invention would be applicable to other physical devices and systems that have both measurable and cyber-controlled attributes. As a first example, the PIDMS may be used in conjunction with a hydraulic system having a cyber-controlled hydraulic pump, a cyber-controlled valve, and a piston. The cyber-controlled hydraulic pump, the cyber-controlled valve, and the piston would each have measurable attributes, for example, hydraulic pressure, pump RPM, valve position, hydraulic fluid flow rate, and piston extension. The PIDMS could then detect, for example, an anomalous cyber command that caused, or would have caused, the piston to extend beyond its working limit. The PIDMS could then take the preventative action of blocking retransmission of the anomalous cyber command to the cyber-controlled hydraulic pump and/or the cyber-controlled valve. Alternatively, the PIDMS could take the mitigative action of sending a countering cyber command, for example, to stop the cyber-controlled hydraulic pump or close the cyber-controlled valve.

As a second example, the PIDMS may be used in conjunction with a battery-powered, wireless home security system. Specifically, the PIDMS could monitor measurable attributes, such as remaining battery life in a unit that includes a doorbell, a microphone, a camera, and a light for the camera. The PIDMS could then detect, for example, anomalous cyber commands that keep turning on the light in an effort to drain the battery, thereby disabling this unit of the home security system and more readily permitting a break-in. The PIDMS could then take the preventative action of blocking retransmission of the anomalous cyber commands to turn on the light. Alternatively, the PIDMS could take the mitigative action of sending a countering cyber command, for example, to turn off the light.

Implementations

Various embodiments of the present invention may be implemented in a number of ways. While the above described embodiments of the present invention were generally described in terms of methods, other embodiments may take other forms. For example, some embodiments of the present invention may take the form of a system with a processor and a memory with instructions for implementing the methods. Still other embodiments may take the form of a computer-readable storage device with instructions for implementing the methods. Note that a propagated signal is not included within the scope of a computer-readable storage device.

In some implementations of the present invention, the PIDMS may take the form of a Bump-In-The-Wire (BITW). This BITW implementation is a communications device which can be inserted into an existing, i.e., legacy, system across an existing communications link without altering the communications endpoints. The BITW implementation of the PIDMS preferably introduces only a relatively small increased latency in communications relative to the original, unsecured, approach. A simple BITW implementation could employ, for example, a Raspberry Pi or Gumstix single board computer. A more capable BITW implementation could employ a computer having greater processing power and memory, with the added benefit of being able to implement more sophisticated and nuanced behavioral-based and/or signature-based anomaly detection schemes.

In other implementations of the present invention, the PIDMS functionality may be added to a server within an overall communications network. The server with PIDMS functionality is preferably located between the Internet or other network, which may be the source of remotely-initiated cyber commands, including possibly nefarious cyber commands, and the device being protected.

In yet other implementations of the present invention, the PIDMS functionality may be added to the device being protected directly. For example, if the device being protected is a computer-aided manufacturing (CAM) robot, then the PIDMS functionality may simply be added to the computer or controller employed to operate the robot, assuming it has sufficient processing power and memory. This implementation offers the benefit that it may readily implement behavioral and signature-based physical system and cyber anomaly detection as it has the most direct access to various aspects of the device, i.e., physical system data, and the commands used to control the device, i.e., cyber data.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A system for proactive intrusion detection and mitigation including:

a first plurality of electronic control devices, where each of the devices is controllable by cyber commands and generates physical system data representative of its current state of operation and where physically aspects of the devices may be controlled by the cyber commands; and a second plurality of proactive intrusion detection and migration electronic systems (PIDMS), each of the second plurality of PIDMS including:

receiving physical system data and cyber data including commands and related cyber data from at least one of the plurality of electronic control devices;

detecting a cyber-physical anomaly wherein a cyber-physical anomaly causes abnormal behavior in cyber commands and physical system data based upon the received physical system data and cyber data, the step of detecting including:

detecting a physical system anomaly (physical anomaly detection) based upon the received physical system data using both a physical signature-based algorithm and a physical behavioral-based algorithm; and detecting a cyber anomaly (cyber anomaly detection) based upon the received cyber data using both a cyber signature-based algorithm that detects known malware and a cyber behavioral-based algorithm;

wherein the detected cyber anomaly has corresponding effects on the physical system and where at least two of the second plurality of PIDMS share data related to the detected anomalies detecting the cyber-physical anomaly based on a detected combination of the physical anomaly detection, the cyber anomaly detection, and the PIDMS shared data related to detected anomalies; and upon detecting a cyber-physical anomaly, taking one of a preventative action and a mitigative action.

2. The system of claim 1, including simultaneously learning and detecting of events.

3. The method of claim 2, including implementing an adaptive resonance theory (ART) to simultaneously learn and detect events.

4. The system of claim 2, including implementing an adaptive resonance theory (ART) artificial neural network (ANN) to simultaneous learn and detect events.

5. The system of claim 1, wherein the system physical data provided by at least one of the first plurality of electronic control devices is sparse and a one of the second plurality of PIDMS incorporates one of ground truth data and power system models to provide expected values for sparse system physical data feature variables.

6. The system of claim 5, wherein at least two of the second plurality of PIDMS conduct peer-to-peer communication to share data related to the detected anomalies.

7. The system of claim 6, wherein the peer-to-peer communications are conducted on a network not coupled to the Internet and the second plurality of PIDMS publish and subscribe on the network to communicate data related to the detected anomalies therebetween.

8. The system of claim 7, wherein the peer-to-peer communication network is a mesh network.

9. The system of claim 8, wherein each of the second plurality of PIDMS is incorporated in one of the first plurality of the electronic control devices.

10. The system of claim 1, wherein the second plurality of PIDMS share data related to the detected anomalies.

11. The system of claim 10, including simultaneously learning and detecting unknown attacks and detecting a cyber-physical anomaly based on a detected combination of the physical anomaly detection, the cyber anomaly detection, and the PIDMS shared data related to the detected anomalies via an adaptive resonance theory (ART).

12. The system of claim 10, including simultaneously learning and detecting unknown attacks and detecting a cyber-physical anomaly based on a detected combination of the physical anomaly detection, the cyber anomaly detection, and the PIDMS shared data related to the detected anomalies via an adaptive resonance theory (ART) artificial neural network (ANN).

13. A system for proactive intrusion detection and mitigation including:

a first plurality of electronic control devices, where each of the devices is controllable by cyber commands and generates physical system data representative of its current state of operation and where physically aspects of the devices may be controlled by the cyber commands; and a proactive intrusion detection and migration electronic system (PIDM), including a second plurality of instantiations of PIDMS, each PIDM instantiation including:

receiving physical system data and cyber data including commands and related cyber data from at least one of the plurality of electronic control devices;

detecting a cyber-physical anomaly wherein a cyber-physical anomaly causes abnormal behavior in cyber commands and physical system data based upon the received physical system data and cyber data, the step of detecting including:

detecting a physical system anomaly (physical anomaly detection) based upon the received physical system data using both a physical signature-based algorithm and a physical behavioral-based algorithm; and detecting a cyber anomaly (cyber anomaly detection) based upon the received cyber data using both a cyber signature-based algorithm that detects known malware and a cyber behavioral-based algorithm;

sharing data related to detected anomalies with each of the second plurality of instantiations of PIDMS;

detecting the cyber-physical anomaly based on a detected combination of the physical anomaly detection, the cyber anomaly detection and the shared data related to the detected anomalies; and upon detecting a cyber-physical anomaly, taking one of a preventative action and a mitigative action.

14. The system of claim 13, including simultaneously learning and detecting unknown attacks and detecting a cyber-physical anomaly based on a detected combination of the physical anomaly detection, the cyber anomaly detection, and the PIDMS shared data related to the detected anomalies via an adaptive resonance theory (ART).

15. The system of claim 13, including simultaneously learning and detecting unknown attacks and detecting a cyber-physical anomaly based on a detected combination of the physical anomaly detection, the cyber anomaly detection, and the PIDMS shared data related to the detected anomalies via an adaptive resonance theory (ART) artificial neural network (ANN).

16. The system of claim 13, including simultaneously learning and detecting unknown attacks and detecting a cyber-physical anomaly based on a detected combination of the physical anomaly detection, the cyber anomaly detection, and the PIDMS shared data related to the detected anomalies via an adaptive resonance theory (ART).

17. The system of claim 13, including simultaneously learning and detecting unknown attacks and detecting a cyber-physical anomaly based on a detected combination of the physical anomaly detection, the cyber anomaly detection, and the PIDMS shared data related to the detected anomalies via an adaptive resonance theory (ART) artificial neural network (ANN).

18. A system for proactive intrusion detection and mitigation including:

a first plurality of electronic control devices, where each of the devices is controllable by cyber commands and generates physical system data representative of its current state of operation and where physically aspects of the devices may be controlled by the cyber commands; and a second plurality of proactive intrusion detection and migration electronic systems (PIDMS), each of the second plurality of PIDMS including:

receiving physical system data and cyber data including commands and related cyber data from at least one of the plurality of electronic control devices;

detecting a cyber-physical anomaly wherein a cyber-physical anomaly causes abnormal behavior in cyber commands and physical system data based upon the received physical system data and cyber data, the step of detecting including:

detecting a physical system anomaly (physical anomaly detection) based upon the received physical system data using both a physical signature-based algorithm and a physical behavioral-based algorithm; and detecting a cyber anomaly (cyber anomaly detection) based upon the received cyber data using both a cyber signature-based algorithm that detects known malware and a cyber behavioral-based algorithm;

sharing data related to detected anomalies with each of the second plurality of PIDMS;

detecting the cyber-physical anomaly based on a detected combination of the physical anomaly detection, the cyber anomaly detection and the shared data related to the detected anomalies; and upon detecting a cyber-physical anomaly, taking one of a preventative action and a mitigative action.

19. The system of claim 18, wherein at the second plurality of PIDMS conduct peer-to-peer communications via a mesh network.

* * * * *